United States Patent [19]

Momota et al.

[11] 3,989,144

[45] Nov. 2, 1976

[54] APPARATUS FOR TRANSFERRING A MOLD

[75] Inventors: Kenzo Momota, Kawasaki; Koji Nunokawa, Tokyo; Yoshihiro Toyoda, Shimodate, all of Japan

[73] Assignee: Nippon Concrete Industries Co. Ltd., Tokyo, Japan

[22] Filed: Nov. 14, 1974

[21] Appl. No.: 523,880

[52] U.S. Cl. ............................ 214/1 PB; 214/1 P; 425/435; 425/455 R
[51] Int. Cl.[2] .................. B28B 21/30; B65G 35/00
[58] Field of Search .................... 425/435, 455 R; 164/286, 287, 288, 300, 289; 214/1 PB, 340

[56] References Cited
UNITED STATES PATENTS

| | | |
|---|---|---|
| 2,585,325 | 2/1952 | Imshaug ....................... 214/1 PB X |
| 2,736,507 | 2/1956 | Neese ........................... 214/1 PB X |
| 2,751,781 | 6/1956 | McConnell .................... 214/1 PB X |
| 2,794,231 | 6/1957 | Lloyd ............................. 425/435 X |
| 3,121,266 | 2/1964 | Ewing ............................ 425/435 X |
| 3,723,044 | 3/1973 | Motheral ........................... 425/435 |
| 3,774,779 | 11/1973 | White ............................. 214/1 PB X |
| 3,800,980 | 4/1974 | Takeuchi ........................ 214/1 PB X |

*Primary Examiner*—Francis S. Husar
*Assistant Examiner*—John S. Brown
*Attorney, Agent, or Firm*—Fidelman, Wolffe & Waldron

[57] ABSTRACT

This invention relates to an apparatus for transferring a mold from a centrifugal compacting device to the next place in the process of manufacturing a concrete pole or pile, by using many jacks to raise a mold from on the centrifugal compacting device for the transferring operation to rails on which the mold is put to be transferred to the next place.

6 Claims, 5 Drawing Figures

APPARATUS FOR TRANSFERRING A MOLD

SUMMARY OF THE INVENTION

This invention relates to an apparatus for transferring a mold. In case of transferring a long concrete pole or pile, for example which length is more than 25 m., after the centrifugal compaction from on a centrifugal compacting device to the next place, cranes have been used to lift up several points of a mold.

However, in this method, in case only very few, for example two, points are lifted up, a product which is not completely solid yet gets deformation by the deflection of the parts among the lifted points, and thereby there is a problem that some cracks are found in the complete product. Also even in case relatively many, for example 4 or 6, points are lifted up, a product gets some deformation and the control of the lifting balance is difficult. Further a product is subject to a bad influence by the vertical movement and vibration due to the machine operation, so that there are problems in respect of working efficiency and safety.

This invention relates to an apparatus by which the above problems are solved. In the apparatus, a mold having a centrifugally compacted concrete pole or pile inside it is not directly lifted up with cranes. Many jacks provided under many rotating rings fixed around a mold are used to transfer the mold from on a centrifugal compacting device to the next place.

According to the invention, since a mold is lifted up concurrently at each rotating ring portion by the jacks, cracks due to deformation are not caused on a product inside the mold and the control of the lifting balance is not required. Moreover unstable movement and vibration as occurred when a mold is directly lifted up with cranes are not caused, so that bad influence on the strength of product and the danger in the lifting operation are prevented and the working efficiency is improved.

The other objects and features of the present invention will be apparent from a few examples embodying the present invention described in the accompanying drawings.

DETAILED DESCRIPTION OF THE INVENTION

Figure 1:
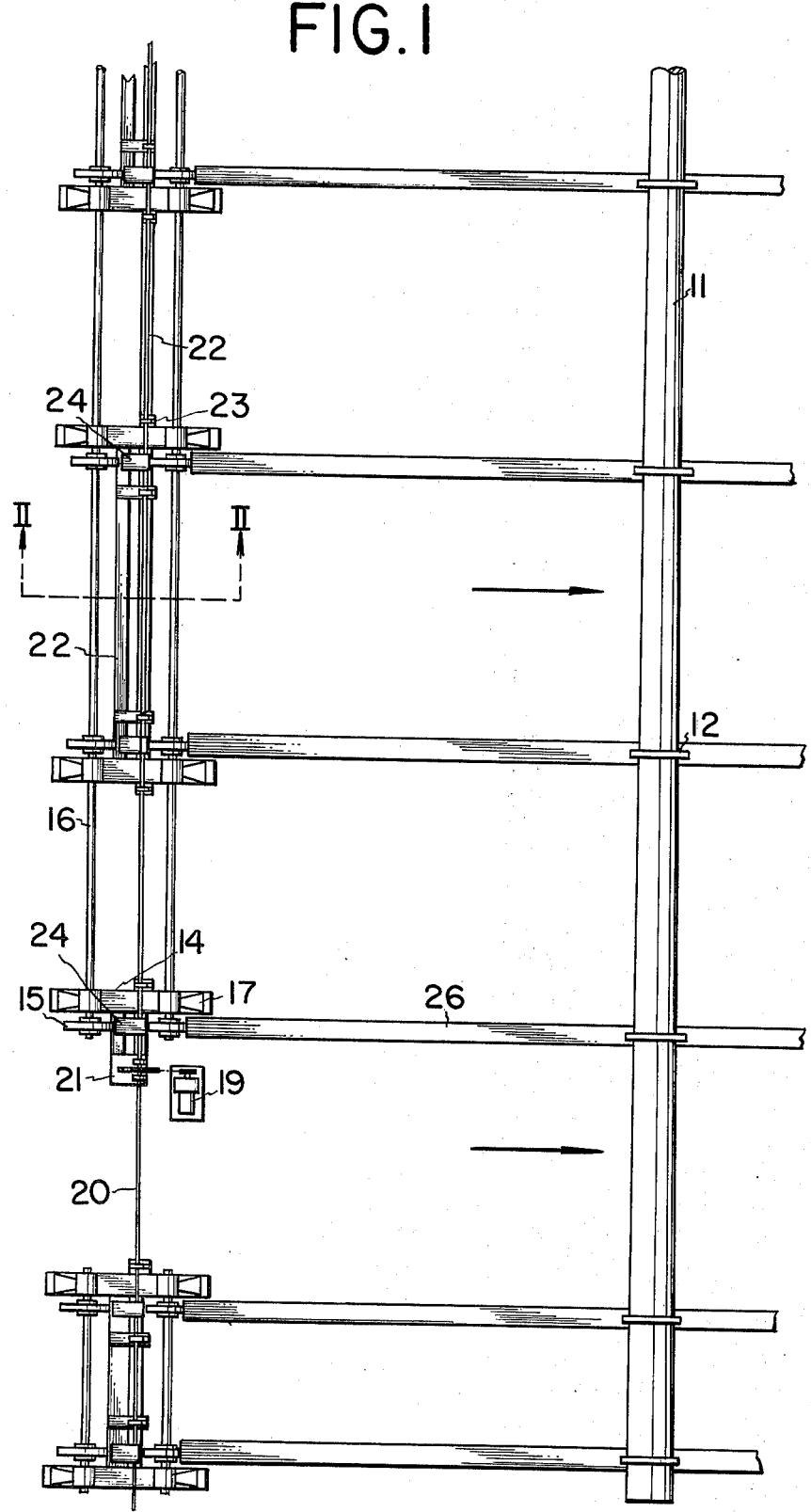
FIG. 1 is a plane view showing the outline of the apparatus of the present invention.

In FIG. 1 showing the apparatus in the first embodiment of the present invention, reference numeral 11 designates a mold to be transferred after a concrete pole or pile inside the mold is cetrifugally compacted. On the outer periphery of the mold 11, many rotating rings 12 are fixed at suitable intervals.

Figure 2:
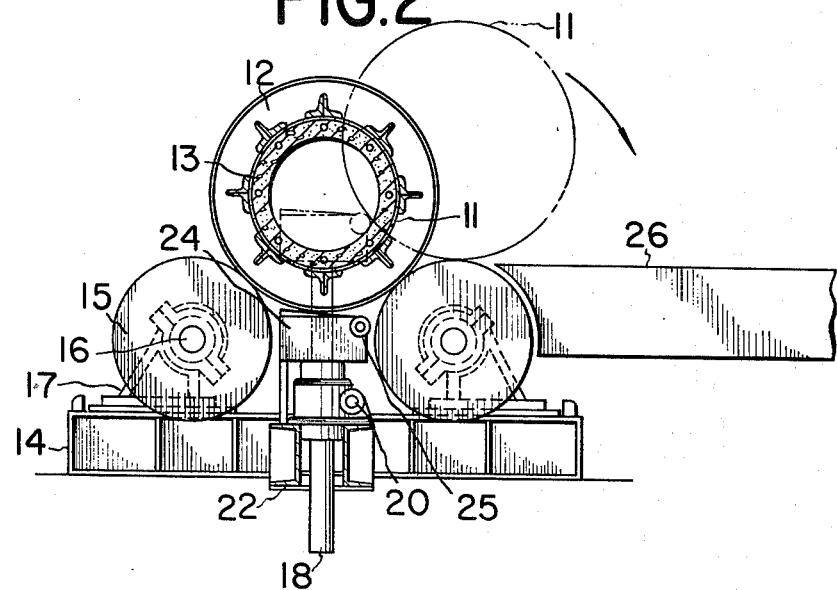
FIG. 2 is an enlarged sectional view taken along the line II — II of FIG. 1.

FIG. 2 is a sectional view taken along the line II — II of FIG. 1, in which: reference numeral 13 designates an incomplete concrete pole which is formed with a certain hardness by the centrifugal compaction, 14 designates a roller base of a centrifugal compacting device on which turning rollers 15 facing to each other at a certain distance are placed in the freely rotatable maner, 16 roller shafts, and 17 supporters for the said roller shafts. Each rotating ring 12 fixed around the mold 11 is placed on each set of the rollers 15 provided in large numbers in parallel with each other and turned by a roller turning device which is not shown in the drawing, and thereby the centrifugal compaction of the concrete pole 13 is done inside the mold 11.

Figure 3:
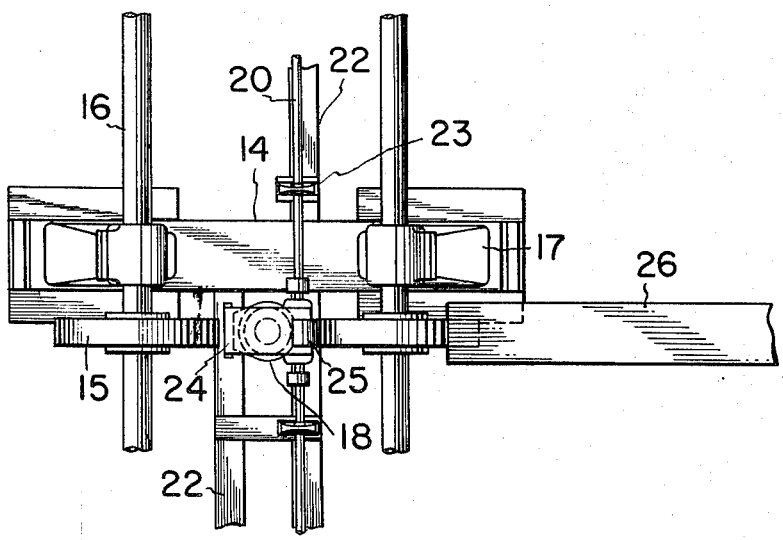
FIG. 3 is an enlarged plane view showing the main part of the apparatus of FIG. 1.

FIG. 3 is a plane view in which the apparatus of FIG. 2 is observed from above. Reference numeral 18 designates jacks for lifting up a mold which are respectively provided between the rollers 15 and under the center of each rotating ring 12 put on each set of the rollers 15. Each jack 18 is connected with a screw 20 which is driven by a motor 19 so that all the jacks 18 ascend and descend concurrently. 21 designates a chain sprocket which is attached to the screw 20. The sprocket 21 is driven by the motor 19 to rotate the screw 20. 22 designates beams provided as required between each roller base. A supporter 23 for the screw 20 is attached to the beam 22. 24 is a jack head to contact with the lower surface of the rotating ring 12. The upper surface of the jack head 24 has a certain inclination descending in the direction of transferring the mold 11 (forward). 25 is a roller which is supported in the freely rotatable manner and a part of which is protruding from the upper forward end of the jack head 24.

26 are transferring rails laid at the positions corresponding to the rollers 15 in the direction that they intersect the mold 11. The rails 26 are laid with a certain inclination descending toward the next working place of the product.

The method of transferring molds by the use of the apparatus constructed as shown in FIGS. 1 to 3 will be described hereinafter. After a concrete pole 13 is centrifugally compacted inside the mold 11 on the rollers 15, the screw 20 is rotated by the motor 19 to ascend the screw jacks 18. By the ascent of the jacks 18, the mold 11 put on the jack heads 24 is ascended and simultaneously the mold 11 is moved forward along the outer periphery of the forward rollers 15 according to the inclination of the upper surface of the head 24 and placed at the position shown by a two-dotted line in FIG. 2. During this process, the center of gravity of the mold 11 is moved gradually toward the position on the forward rollers 15. The roller 25 provided at the forward end of the jack head 24 has the function of making the movement of the mold smooth by contacting with the rotating ring 12 at the time of ascent of the jack.

The mold 11 is moved further from the position shown by a two-dotted line in FIG. 2 onto the transferring rails 26 and rolled down to the forward determined place by the inclination of the rails as shown in FIG. 1.

Figure 4:
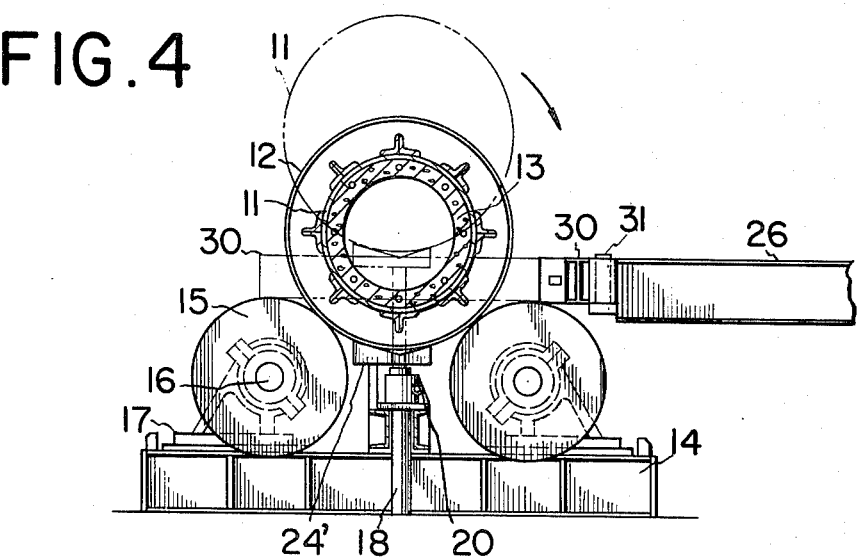
FIG. 4 is an enlarged left-side sectional view showing the apparatus in the other embodiment of the present invention.

In the abovementioned embodiment the mold 11 is lifted up and started to be transferred only by the jacks 18. In the second embodiment which will be described in the following, in order to start the transfer of the mold 11, arms are used for putting the mold 11 on it. FIG. 4 is a left-side sectional view corresponding to FIG. 2 in the first embodiment. In the drawing, a jack head 24' is formed into a V-block and arms 30 are provided in the freely rotatable manner around the ends of the rails 26 so that they can be placed at the upper part of each set of the rollers 15. 31 designates shafts of the arms 30 which are fixed to the ends of the rails 26. The upper surface of the arm 30 becomes the same plane as that of the rail 26 when it is placed at the upper part of each set of the rollers 15 as shown by a two-dotted line in FIG. 4.

Figure 5:
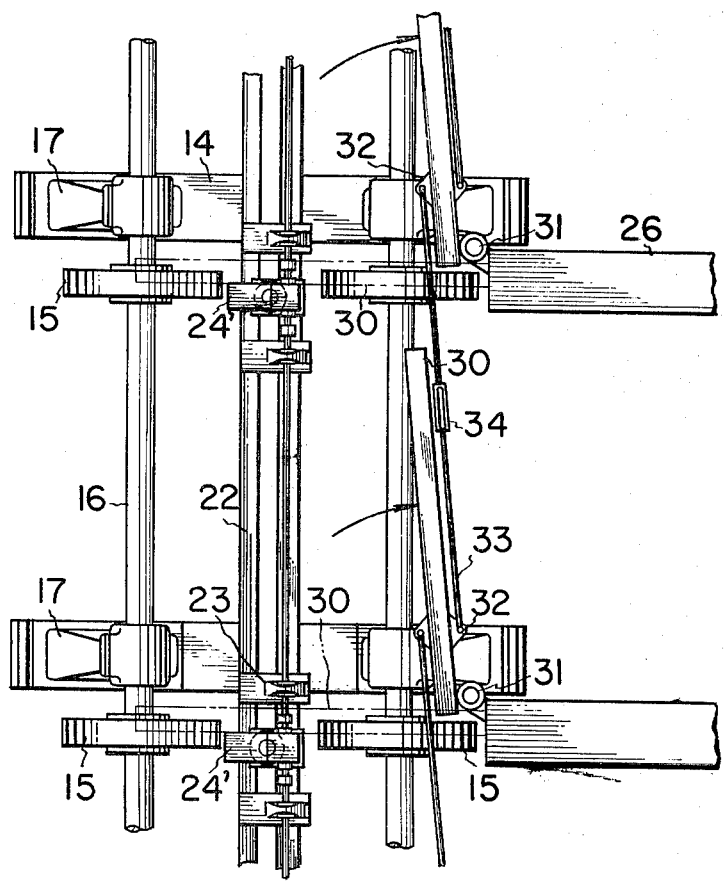
FIG. 5 is an enlarged plane view showing the main part of the apparatus of FIG. 4.

FIG. 5 is a plane view of the apparatus shown in FIG. 4; in which the arm 30 is turned around the shaft 31 from the position on the rollers 15 to the forward position to be stowed away. The arms are constructed as described in the following so that each arm can be turned concurrently.

Brackets 32 are provided at the both sides of the end of each arm 30 which are connected with the rails. The brackets 32 of each arm which are facing to each other are connected by a rod 33. 34 designates a turnbuckle which is provided at the middle of the rod 33 to adjust the length of the rod. Since each arm is connected with each other by the said rod 33, if one arm is turned, other arm are also turned. Therefore the operation of the arms can be easily done.

In the transferring operation of a mold after the centrifugal compaction by the use of the apparatus in the abovementioned second embodiment, first the mold 11 is lifted up to the certain height by the jacks 18 similarly to the first embodiment, and next the arms 30 are turned to be placed respectively under each rotating ring of the mold, and successively the jacks are descended so that the load of the mold 11 is moved onto the said arms 30. At this time the rotating rings 12 roll on the arms 30 by the inclination of the arms and are placed on the rails 26 to be transferred to the next place. The ascent and descent and the rolling of the mold 11 are done supporting the outer periphery of each rotating ring. Accordingly the relation of the position of the jack head 24' and the arm 30 placed on the rollers 15 to the width of the rotating ring 12 put on the set of the rollers 15 is as shown in FIG. 5 so that the jack head 24' and the arm 30 do not disturb each other during the operation. Namely they are respectively placed at the left and right sides making the line connecting the center of the width of each roller 15 a border. Each rotating ring 12 is placed at the center of the width of each roller 15, so that the jack head 24' and the arm 30 respectively contact with the left-half and right-half width of the rotating ring 12. After the mold 11 is transferred, the arms 30 are truned back again to the forward position and the next mold 11 is put on the rollers 15.

Hereinbefore the two embodiments of the present invention have been described. In these embodiments a jack of a fluid-pressure cylinder can be also used instead of the screw jack 18.

We claim:

1. In the combination of a transfer apparatus and a centrifugal compacting device having a plurality of pairs of adjacent rollers positioned at intervals along a pair of shafts for driving a corresponding plurality of rings on a mold, said transfer apparatus comprises:

a plurality of transfer rails leading from one roller of said pair of rollers;

a plurality of lift means positioned between the rollers of a pair of rollers for engaging said rings and raising said rings above said rollers by vertical movement of said lift means; and a plurality of arm means movably mounted to a corresponding transfer rail for traversing the distance between said lift means and said transfer rail in an extended position and for engaging said rings and transferring said mold from said lift means to said transfer rail;

means connected to each arm means for simultaneously moving said arm means from contracted position to an extended position after said lift means has raised said rings above said pair of rollers.

2. The transfer apparatus of claim 1 wherein said arm means are pivotally mounted to said transfer rail and rotate in a substantially horizontal plane between said contracted and said extended positions.

3. The transfer apparatus of claim 1 including concave surfaces on said lift means for preventing horizontal movement of said rings during the raising vertical movement of said lift means.

4. The transfer apparatus of claim 1 wherein a lift means, a transfer rail, and a pair of drive rollers are provided for each ring.

5. The transfer apparatus of claim 4 wherein said arm means and said transfer rails are inclined away from said pair of rollers and are positioned to engage a ring.

6. The transfer apparatus of claim 1 wherein said lift means are jacks and includes a common screw shaft for simultaneous operation of said jacks.

* * * * *